(12) United States Patent
Park et al.

(10) Patent No.: US 10,388,088 B2
(45) Date of Patent: Aug. 20, 2019

(54) ROLL AND BRAKE TEST SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventors: Jihoon Park, Suwon-si (KR); Jin Seok Kim, Yongin-si (KR); David Oh, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 35 days.

(21) Appl. No.: 15/644,567

(22) Filed: Jul. 7, 2017

(65) Prior Publication Data
US 2018/0174381 A1    Jun. 21, 2018

(30) Foreign Application Priority Data

Dec. 16, 2016 (KR) .................. 10-2016-0172967

(51) Int. Cl.
| | | |
|---|---|---|
| G07C 5/08 | (2006.01) | |
| B60W 10/06 | (2006.01) | |
| B60W 10/10 | (2012.01) | |
| B60W 10/18 | (2012.01) | |
| B60W 10/20 | (2006.01) | |
| B60W 30/02 | (2012.01) | |

(Continued)

(52) U.S. Cl.
CPC ........... *G07C 5/0808* (2013.01); *B60W 10/06* (2013.01); *B60W 10/10* (2013.01); *B60W 10/18* (2013.01); *B60W 10/20* (2013.01); *B60W 30/02* (2013.01); *G01M 13/028* (2013.01); *G01M 17/007* (2013.01); *B60W 2510/20* (2013.01); *B60W 2520/10* (2013.01); *B60W 2520/14* (2013.01); *B60W 2710/0666* (2013.01); *B60W 2710/10* (2013.01); *B60W 2710/18* (2013.01); *B60W 2710/207* (2013.01); *B60W 2720/106* (2013.01)

(58) Field of Classification Search
CPC .............. B60C 23/0471; B60C 23/044; B60C 23/0442; B60C 23/0472; B60C 23/0479
See application file for complete search history.

(56) References Cited

U.S. PATENT DOCUMENTS

| | | | | |
|---|---|---|---|---|
| 3,953,083 A | * | 4/1976 | Latvala | ............... B60T 8/17613 303/156 |
| 4,693,493 A | * | 9/1987 | Ikemoto | ............. B60G 17/0162 280/124.106 |

(Continued)

FOREIGN PATENT DOCUMENTS

| | | | |
|---|---|---|---|
| EP | 218864 A | * | 4/1987 |
| GB | 2418648 | * | 4/2006 |

*Primary Examiner* — Jean Paul Cass
(74) *Attorney, Agent, or Firm* — Knobbe Martens Olson & Bear LLP (57) ABSTRACT

A roll and brake test system and a method of controlling the same are disclosed. The roll and brake test system can automatically test a steering device, an accelerator, a transmission, and a brake of a vehicle. The roll and brake test system includes: a roll and brake apparatus for accommodating a vehicle on a roll; a management apparatus for controlling the roll and brake apparatus and for generating test information for testing the vehicle; and a control apparatus for controlling the vehicle according to the test information from the management apparatus.

11 Claims, 10 Drawing Sheets

(51) Int. Cl.
*G01M 13/028* (2019.01)
*G01M 17/007* (2006.01)

(56) References Cited

U.S. PATENT DOCUMENTS

| | | | | |
|---|---|---|---|---|
| 4,968,999 A * | 11/1990 | Fodale | ............... | B60W 30/18 |
| | | | | 477/107 |
| 6,425,643 B2 * | 7/2002 | Shirai | ............... | B60T 7/042 |
| | | | | 188/1.11 E |
| 9,791,860 B2 * | 10/2017 | Phillips | ............... | G05D 1/0033 |
| 9,857,189 B2 * | 1/2018 | Wang | ............... | B60L 58/12 |
| 2001/0005803 A1 * | 6/2001 | Cochofel | ............... | B60G 17/0185 |
| | | | | 701/1 |
| 2002/0062686 A1 * | 5/2002 | Keaton | ............... | B60P 1/4421 |
| | | | | 73/116.01 |
| 2003/0001346 A1 * | 1/2003 | Hamilton | ............... | B60G 17/0152 |
| | | | | 280/5.515 |
| 2006/0074530 A1 * | 4/2006 | Meyers | ............... | B60G 17/016 |
| | | | | 701/1 |
| 2006/0123896 A1 * | 6/2006 | Wimmer | ............... | G01L 5/28 |
| | | | | 73/116.06 |
| 2006/0178792 A1 * | 8/2006 | Ortiz | ............... | B60R 16/0234 |
| | | | | 701/29.1 |
| 2007/0162257 A1 * | 7/2007 | Kostyk | ............... | G06Q 10/04 |
| | | | | 702/182 |
| 2011/0063099 A1 * | 3/2011 | Miller | ............... | G07C 5/085 |
| | | | | 340/439 |
| 2011/0106339 A1 * | 5/2011 | Phillips | ............... | G05D 1/0033 |
| | | | | 701/2 |
| 2012/0131994 A1 * | 5/2012 | Ben-David | ............... | G01M 17/0074 |
| | | | | 73/116.01 |
| 2015/0104757 A1 * | 4/2015 | Moncrief | ............... | G09B 9/302 |
| | | | | 434/38 |
| 2015/0187224 A1 * | 7/2015 | Moncrief | ............... | G09B 9/052 |
| | | | | 434/30 |
| 2016/0214434 A1 * | 7/2016 | Wood | ............... | B60C 5/22 |
| 2017/0227369 A1 * | 8/2017 | Wang | ............... | B60L 58/12 |
| 2017/0337573 A1 * | 11/2017 | Toprak | ............... | G06Q 30/0202 |

* cited by examiner

ROLL AND BRAKE TEST SYSTEM AND METHOD OF CONTROLLING THE SAME

CROSS-REFERENCE TO RELATED APPLICATION

This application claims priority to and the benefit of Korean Patent Application No. 10-2016-0172967 filed in the Korean Intellectual Property Office on Dec. 16, 2016, the entire contents of which are incorporated herein by reference.

BACKGROUND (a) Field

The present disclosure relates to a roll and brake test system. More particularly, the present disclosure relates to a roll and brake test system and a method of controlling the same that can automatically test a steering device, an accelerator, a transmission, and a brake of a vehicle using a roll and brake apparatus.

(b) Description of the Related Art

A roll and brake apparatus enables an inline processor to guarantee a quality of a vehicle. The roll and brake apparatus can test a vehicle error, assembly, an acceleration performance, and a brake performance in a running condition similar to a situation occurring on a road.

The roll and brake apparatus tests a whole vehicle in which assembly is complete on each specification basis via each line and determines whether to release the vehicle.

Such a roll and brake apparatus selects a model, adjusts a wheel base, enters a test vehicle on a roll, moves upward a retaining roller, and tests the vehicle.

That is, when a vehicle enters in the roll and brake apparatus, a human driver gets on the vehicle and sequentially performs operation such as acceleration, natural deceleration, neutral, braking, and stop using the roll and brake apparatus.

However, in a conventional case, because a driver gets on a vehicle and manipulates and tests a steering device, an accelerator, a transmission, and a brake, a quality deviation occurs in a test result according to the human driver, a work time, and a driving condition.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to provide a roll and brake test system and a method of controlling the same having advantages of being capable of automatically testing a steering device, an accelerator, a transmission, and a brake of a vehicle using a roll and brake apparatus.

The present disclosure has been made in an effort to further provide a roll and brake test system and a method of controlling the same having advantages of being capable of testing a vehicle when a control apparatus transmits a control signal through a wireless communication device that is installed in the vehicle.

An aspect of the present invention provides a roll and brake test system including: a roll and brake apparatus that locates a vehicle on a roll; a management apparatus that manages the roll and brake apparatus and that generates test information for testing the vehicle; and a control apparatus that receives test information from the management apparatus and that transmits a control signal to the vehicle to test the vehicle according to the test information.

The control apparatus may generate an acceleration control signal based on a speed profile and transmit an acceleration control signal to an Electronic Stability Control (ESC) of the vehicle.

The vehicle may include an Engine Management System (EMS) that receives an acceleration control signal from the ESC and that sets an engine torque based on the acceleration control signal and that controls an engine based on the engine torque to accelerate the vehicle.

The roll and brake apparatus may include location sensors that are located at both sides of the vehicle and that measures a lateral direction location of the vehicle.

The control apparatus may receive lateral direction location information from the location sensors when the vehicle runs, determine whether the vehicle is in danger to deviate from the roll based on the lateral direction location information, and stop driving of the roll that is included in the roll and brake apparatus, if the vehicle is in danger to deviate from the roll.

The control apparatus may receive lateral direction location information from the location sensors when the vehicle accelerates, generate an angle control signal according to the lateral direction location information, and transmit the angle control signal to a steering device that is included in the vehicle.

The steering device may receive an angle control signal from the control apparatus and adjust an angle based on the angle control signal.

The vehicle may further include an angle measurement unit that measures an angle of the steering device, and the angle measurement unit may measure an angle of the steering device to transmit the angle to the control apparatus.

The brake that is included in the vehicle may include: a first valve that supplies a brake liquid to a motor; and a second valve that supplies a brake liquid that is received from the first valve to a brake pad.

The control apparatus may generate a braking control signal based on a speed profile and transmit the braking control signal to an ESC of the vehicle.

The control apparatus may generate a shift control signal based on a speed profile and transmit the shift control signal to a shift controller of the vehicle.

The shift controller may perform shift based on the shift control signal and transmit shift information to an EMS of the vehicle.

Another embodiment of the present invention provides a method of controlling a roll and brake test that enables a control apparatus to test a vehicle including: generating an acceleration control signal based on a speed profile, when the vehicle enters on a roll of a roll and brake apparatus and testing an accelerator that is included in the vehicle based on the acceleration control signal; generating an angle control signal according to lateral direction location information, when the vehicle accelerates and testing a steering device that is included in the vehicle based on the angle control signal; generating a shift control signal based on the speed profile and testing a transmission that is included in the vehicle based on the shift control signal; and generating a braking control signal based on the speed profile and testing the brake that is included in the vehicle based on the generated braking control signal.

DETAILED DESCRIPTION OF EMBODIMENTS

Hereinafter, embodiments of the present invention will be described in detail with reference to the accompanying drawings.

At least one test can be performed for a vehicle placed on a roll-and-break system 200 without a human driver. For controlling the vehicle during a test, a control system 100 is connected to a target vehicle 300. The control system is configured to control at least one from an engine, a wheel-driving motor, a transmission, a steering system, a brake system of the vehicle according to a predetermined test program. In embodiments, the control system 100 controls the vehicle via a communication module connecting the target vehicle 300 and the control system 100.

In embodiments, the control system 100 receives information regarding a test program to be performed for the target vehicles 300. In embodiments, the test program information includes at least one event of vehicle testing, at least one predetermined speed profile or other form of driving parameters, conditions for vehicle tests on the roll-and-brake system 200. The control system 100 generates control signals for driving the target vehicle (to control acceleration or braking of the test vehicle) without a human driver in accordance with the test program.

While driving the target vehicle without a human driver, the control system 100 generates signals for steering the target vehicle to maintain the target vehicle's position within a predetermined range. The control system 100 generates signals for steering the target vehicle using information from at least one sensor 230 is installed at the roll-and-brake system. In embodiments, at least one sensor 230 is installed at the roll-and-brake system for sensing the target vehicle's position (in reference to a reference point of the roll-and-brake system), the target vehicle's orientation (forward direction). In embodiments, the sensor 230 monitors target vehicle's orientation in reference to rotational axis of a roller of the roll-and-break system 200 when viewed from over the vehicle. In embodiments, the control system 100 generates signals for steering the target vehicle using at least one from the vehicle's current speed, driving direction, steering angle, (lateral) position, a future speed according to a predetermined speed profile of a current test program, and a future event according to the current test program.

In embodiments, prior to perform tests of the target vehicle on the roll-and-break system, the control system 100 is connected to the target vehicle. The control system drives the target vehicle from a predetermined location of a test facility without a human driver for placing the vehicle in a predetermined test-starting position on the roll-and-break system. In embodiments, subsequent to testing of the vehicle, the control system drives, without a human driver, the tested vehicle to a predetermined location of a test facility.

Figure 1:
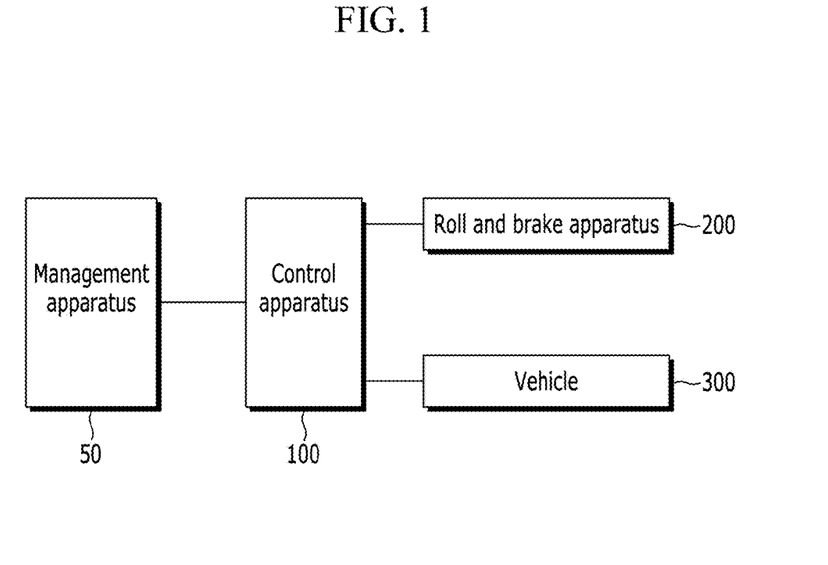
FIG. 1 is a block diagram illustrating a roll and brake test system according to an embodiment of the present invention.

FIG. 1 is a block diagram illustrating a roll and brake test system according to an embodiment of the present invention.

Referring to FIG. 1, a roll and brake test system includes a management apparatus 50, a control apparatus 100, a roll and brake apparatus 200, and a vehicle 300.

The management apparatus 50 manages the roll and brake apparatus 200 and generates test information for testing the vehicle 300. In this case, test information may include at least one test item that will be examined about the vehicle 300.

The management apparatus 50 may include an emergency stop button and a test cancellation button. In this case, the emergency stop button is a button that enables an operator to stop a test when a problem occurs in the roll and brake apparatus 200, the control apparatus 100, and the vehicle 300, and the test cancellation button is a button that enables an operator to cancel a test of the vehicle 300.

When the emergency stop button or the test cancellation button is pressed, the management apparatus 50 generates a control release signal to provide the control release signal to the control apparatus 100.

The control apparatus 100 receives test information from the management apparatus 50 and generates a control signal according to test information. In order to test the vehicle 300, the control apparatus 100 transmits a control signal to the vehicle 300.

When a control release signal is received from the management apparatus 50, the control apparatus 100 stops driving of a driver that drives a roll 210 of the roll and brake apparatus 200 to stop a test of the vehicle 300.

For such an object, the control apparatus 100 may be implemented with at least one processor operating by a predetermined program, and the predetermined program may be programmed to perform each step of a method of controlling a test according to an embodiment of the present invention.

Figure 2:
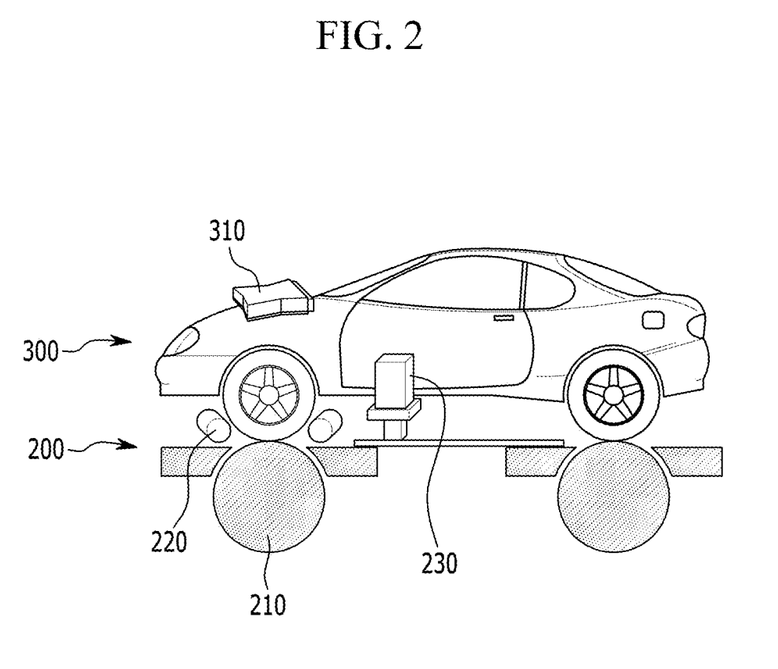
FIG. 2 is a diagram illustrating a vehicle that is located at a roll and brake apparatus according to an embodiment of the present invention.

In order to use the roll and brake apparatus 200, as shown in FIG. 2, the vehicle 300 is located on the roll 210. In this case, in the roll and brake apparatus 200, at the front side and the rear side of the roll 210, retaining rollers 220 are installed, and when the vehicle 300 enters in the roll and brake apparatus 200, the retaining roller 220 move upward to prevent the vehicle 300 from deviating from the roll 210.

In the roll and brake apparatus 200, as shown in FIG. 2, at both sides of the vehicle 300, location sensors 230 are installed. In order to prevent the vehicle 300 from deviating from the roll 210, such location sensors 230 measure a lateral direction of the vehicle 300 and provide measured lateral direction location information to the control apparatus 100.

The vehicle 300 is located on the roll 210 of the roll and brake apparatus 200, and the roll and brake apparatus 200 tests major constituent elements according to a control signal of the control apparatus 100. Such a vehicle 300 will be described in detail with reference to FIG. 3.

Figure 3:
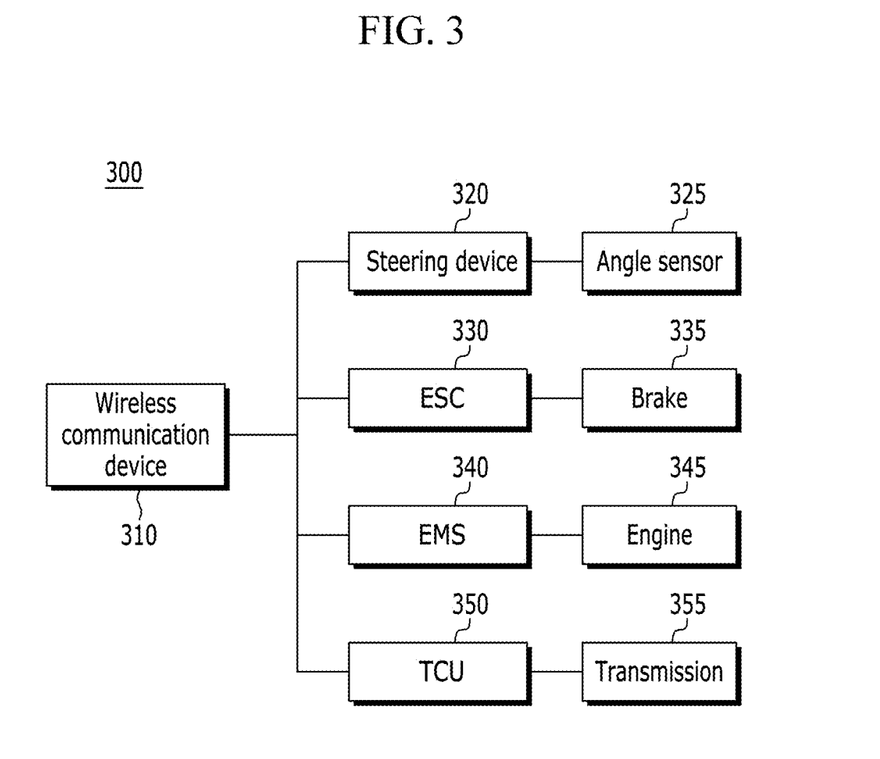
FIG. 3 is a block diagram illustrating a vehicle that is located on a roll and brake test system according to an embodiment of the present invention.

FIG. 3 is a block diagram illustrating a vehicle 300 that is located on a roll and brake test system according to an embodiment of the present invention.

Referring to FIG. 3, the vehicle 300 includes a wireless communication device 310, a steering device 320, an angle sensor 325, an Electronic Stability Control (hereinafter, referred to as 'ESC') 330, a brake 335, an Engine Management System (hereinafter, referred to as 'EMS') 340, an engine 345, a Transmission Control Unit (hereinafter, referred to as 'TCU') 350, and a transmission 355.

The wireless communication device 310 is connected to the control apparatus 100 by wireless to transmit and receive data to and from the control apparatus 100. That is, the wireless communication device 310 receives a control signal from the control apparatus 100. Further, the wireless communication device 310 transmits angle information that is measured by the angle sensor 325. For example, as shown in FIG. 2, the wireless communication device 310 may be wireless On-Board Diagnostics (OBD).

When the vehicle 300 is started, the steering device 320 operates a steering motor to operate a handle.

Such a steering device 320 may be Motor Driven Power Steering (MDPS).

The angle sensor 325 measures an angle of the steering device 320. The angle sensor 325 transmits measured angle information to the control apparatus 100 through the wireless communication device 310.

Such an angle sensor 325 may be a Steering Angle Sensor 325 (SAS).

The ESC 330 controls general operations of the brake 335. The ESC 330 receives a braking control signal through the wireless communication device 310 and controls the brake 335 based on the braking control signal to test whether there is abnormality in the brake 335.

The ESC 330 receives an acceleration control signal through the wireless communication device 310 and provides the received acceleration control signal to the EMS 340. In this case, the ESC 330 and the EMS 340 may be connected through a Controller Area Network (CAN) communication network.

Figure 4:
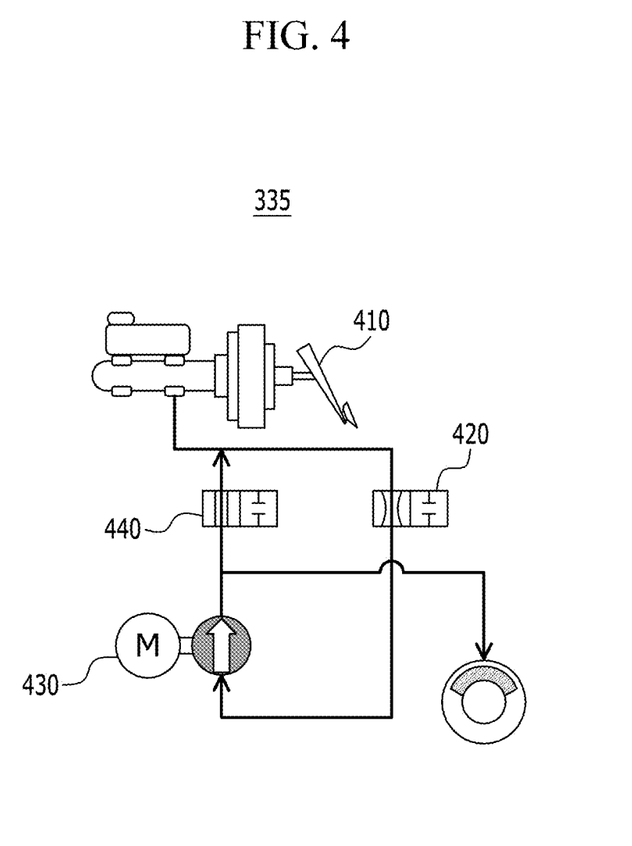
FIG. 4 is a diagram illustrating a brake of a vehicle according to an embodiment of the present invention.

The brake 335 stops the vehicle 300. As shown in FIG. 4, such a brake 335 includes a brake pedal 410, a first valve 420, a motor 430, and a second valve 440.

In order to request a braking force, a driver may step on the brake pedal 410.

The first valve 420 supplies a brake liquid to the motor 430. That is, the first valve 420 is opened and closed according to a location value of the brake pedal 410 or a control of the ESC 330 to supply a brake liquid to the motor 430.

Such a first valve 420 may be an ESV valve.

The motor 430 provides a braking force. The motor 430 supplies a brake liquid to the second valve 440 according to the control of the ESC 330. In this case, the motor 430 adjusts a duty according to a braking control signal of the ESC 330 to adjust an amount of a brake liquid that is supplied to the second valve 440.

The second valve 440 provides a brake liquid to the brake pedal 410. The second valve 440 supplies a brake liquid to the brake pedal 410 according to the control of the ESC 330. In this case, the second valve 440 adjusts a duty according to a braking control signal of the ESC 330 to adjust an amount of a brake liquid that is supplied to the brake pedal 410.

Such a second valve 440 may be a TC valve.

The EMS 340 controls general operations of the engine 345 according to an engine operation state. In other words, the EMS 340 receive an acceleration control signal from the ESC 330 and sets an engine torque based on the acceleration control signal. The EMS 340 controls the engine 345 based on an engine torque to accelerate the vehicle 300.

The engine 345 burns fuel to generate power. As the engine 345, known various engines such as a gasoline engine or a diesel engine using existing fossil fuel may be used.

Such an engine 345 is driven according to the control of the EMS 340. That is, the engine 345 is driven according to an engine torque that is provided from the EMS 340 to increase a vehicle speed.

The TCU 350 controls general operations of the transmission 355. In other words, the TCU 350 receives a shift control signal through the wireless communication device 310. The TCU 350 controls the transmission 355 based on a shift control signal.

The TCU 350 controls the transmission 355 and transmits shift information to the EMS 340. In this case, shift information may represent a gear shift stage that is engaged with the transmission 355. The TCU 350 and the EMS 340 may be connected through a CAN communication network.

The transmission 355 operates according to the control of the TCU 350. That is, the transmission 355 may change a gear shift stage according to the control of the TCU 350.

Hereinafter, a method of controlling a test of a roll and brake test system will be described with reference to FIGS. 5 to 10.

Figure 5:
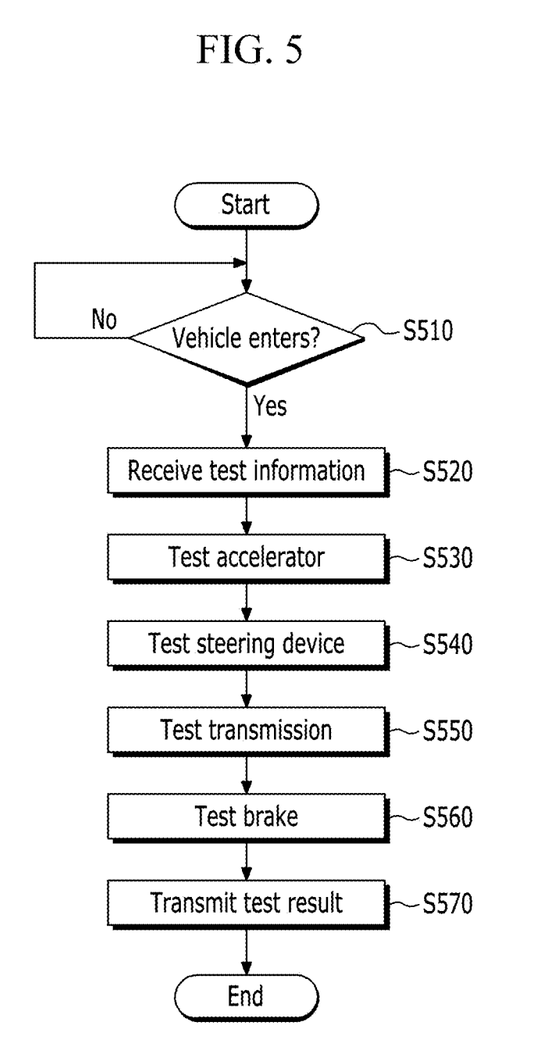
FIG. 5 is a flowchart illustrating a method of controlling a roll and brake test according to an embodiment of the present invention.

FIG. 5 is a flowchart illustrating a method of controlling a roll and brake test according to an embodiment of the present invention.

Referring to FIG. 5, the control apparatus 100 determines whether the vehicle 300 enters in the roll and brake apparatus 200 (S510).

If the vehicle 300 does not enter in the roll and brake apparatus 200, the process returns to step S210 and the control apparatus 100 monitors whether the vehicle 300 enters in the roll and brake apparatus 200.

The control apparatus 100 receives test information from the management apparatus 50 (S520). In this case, test information may include a speed profile. The speed profile is information for testing the vehicle 300 and may be previously set.

Figure 6:
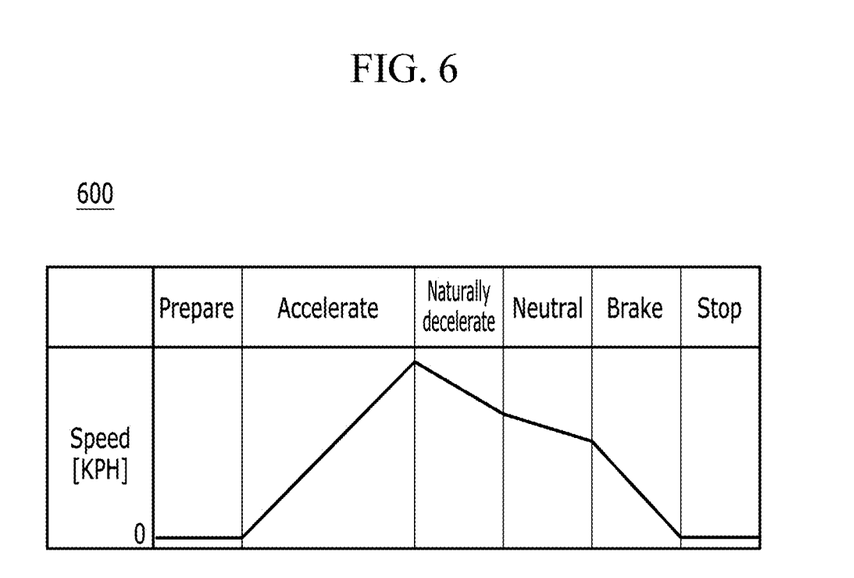
FIG. 6 is a diagram illustrating a speed profile according to an embodiment of the present invention.

The control apparatus 100 tests an accelerator of the vehicle 300 (S530). In other words, the control apparatus 100 generates an acceleration control signal based on a speed profile. For example, as shown in FIG. 6, the control apparatus 100 may generate an acceleration control signal based on a speed profile 600 to which a sequential speed of the vehicle 300 is matched.

The control apparatus 100 tests the accelerator of the vehicle 300 based on the acceleration control signal. A method of testing the accelerator of the vehicle 300 in this way will be described in detail with reference to FIG. 8.

The control apparatus 100 tests the steering device 320 of the vehicle 300 (S540). Specifically, when the vehicle 300 runs on the roll 210 of the roll and brake apparatus 200, the location sensor 230 measures a lateral direction of the vehicle 300 and provides measured lateral direction location information to the control apparatus 100. The control apparatus 100 generates an angle control signal based on lateral direction location information. The control apparatus 100 tests the steering device 320 based on the angle control signal. A method of testing the steering device 320 of the vehicle 300 in this way will be described in detail with reference to FIG. 9.

Figure 7:
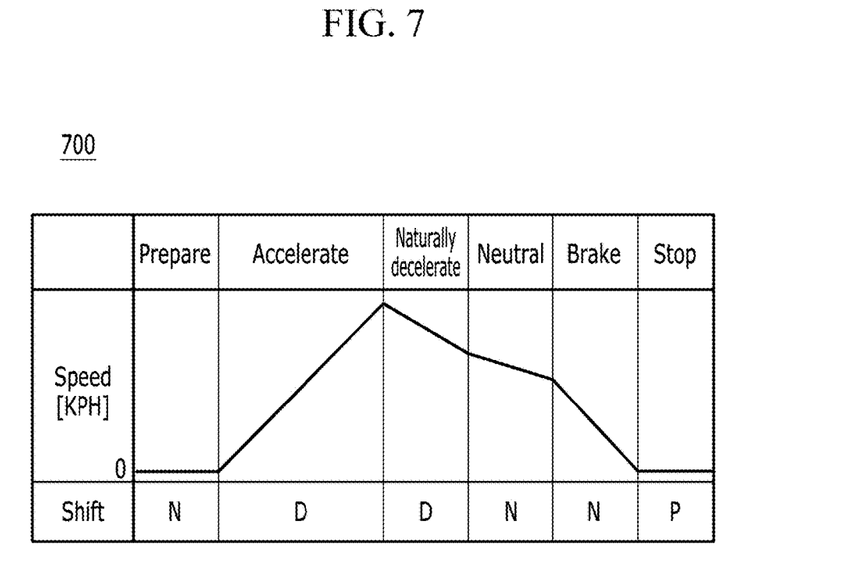
FIG. 7 is a diagram illustrating a speed profile according to another embodiment of the present invention.

The control apparatus 100 tests the transmission of the vehicle 300 (S550). In other words, the control apparatus 100 generates a shift control signal based on a speed profile. For example, as shown in FIG. 7, the control apparatus 100 may generate a shift control signal based on a speed profile 700 to which a sequential gear shift stage is matched.

The control apparatus 100 transmits the shift control signal to the wireless communication device 310 of the vehicle 300. The TCU 350 receives the shift control signal from the wireless communication device 310 and controls the transmission 355 based on the shift control signal. When shift of the transmission 355 is complete, the TCU 350 provides shift information to the EMS 340.

The control apparatus 100 tests the brake 335 of the vehicle 300 (S560). Specifically, the control apparatus 100 generates a braking control signal based on the speed profile. The control apparatus 100 tests the brake 335 of the vehicle 300 based on a braking control signal. A method of testing the brake 335 of the vehicle 300 in this way will be described in detail with reference to FIG. 10.

The control apparatus 100 transmits a test result of the vehicle 300 to the management apparatus 50 (S570). That is, the control apparatus 100 transmits a test result of the accelerator, the steering device 320, the transmission, and the brake 335 of the vehicle 300 to the management apparatus 50. The management apparatus 50 receives a test result from the control apparatus 100 and stores and manages the received test result.

Figure 8:
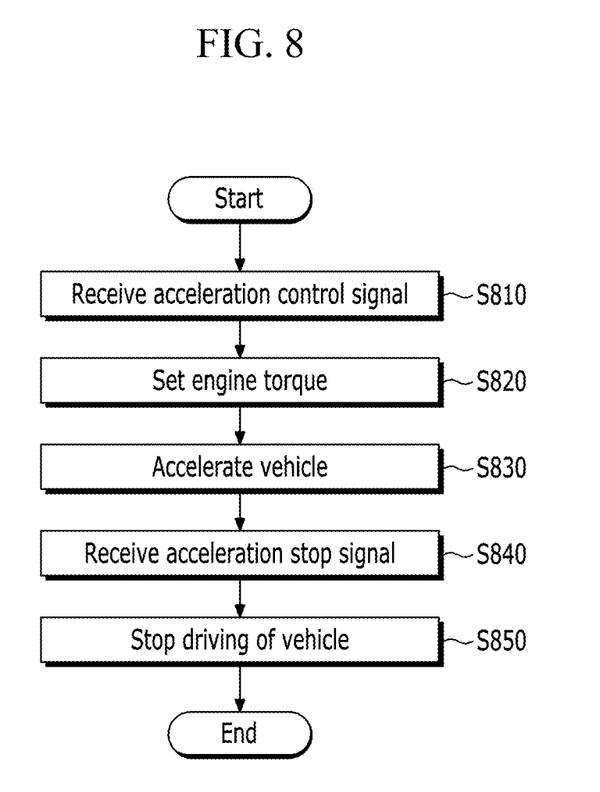
FIG. 8 is a flowchart illustrating a method of testing an accelerator of a vehicle according to an embodiment of the present invention.

FIG. 8 is a flowchart illustrating a method of testing an accelerator of a vehicle according to an embodiment of the present invention.

Referring to FIG. 8, the vehicle 300 receives an acceleration control signal (S810). In other words, the wireless communication device 310 of the vehicle 300 receives an acceleration control signal from the control apparatus 100. The wireless communication device 310 provides an acceleration control signal to the ESC 330. The ESC 330 provides the acceleration control signal to the EMS 340.

The vehicle 300 sets an engine torque (S820). That is, the EMS 340 of the vehicle 300 sets an engine torque for controlling the engine 345 based on the acceleration control signal.

The vehicle 300 controls the engine 345 to be accelerated (S830). That is, the EMS 340 of the vehicle 300 controls the engine 345 based on an engine torque to accelerate the vehicle 300.

The vehicle 300 receives an acceleration stop signal (S840). In other words, the control apparatus 100 determines a speed of the vehicle 300, and if a speed of the vehicle 300 is equal to or larger than a predetermined reference speed, the control apparatus 100 generates an acceleration stop signal. The control apparatus 100 transmits an acceleration stop signal to the wireless communication device 310 of the vehicle 300. The ESC 330 receives the acceleration stop signal through the wireless communication device 310 and provides the received acceleration stop signal to the EMS 340.

The vehicle 300 stops driving (S850). That is, when receiving the acceleration stop signal from the ESC 330, the EMS 340 stops driving of the engine 345 to stop running of the vehicle 300.

Figure 9:
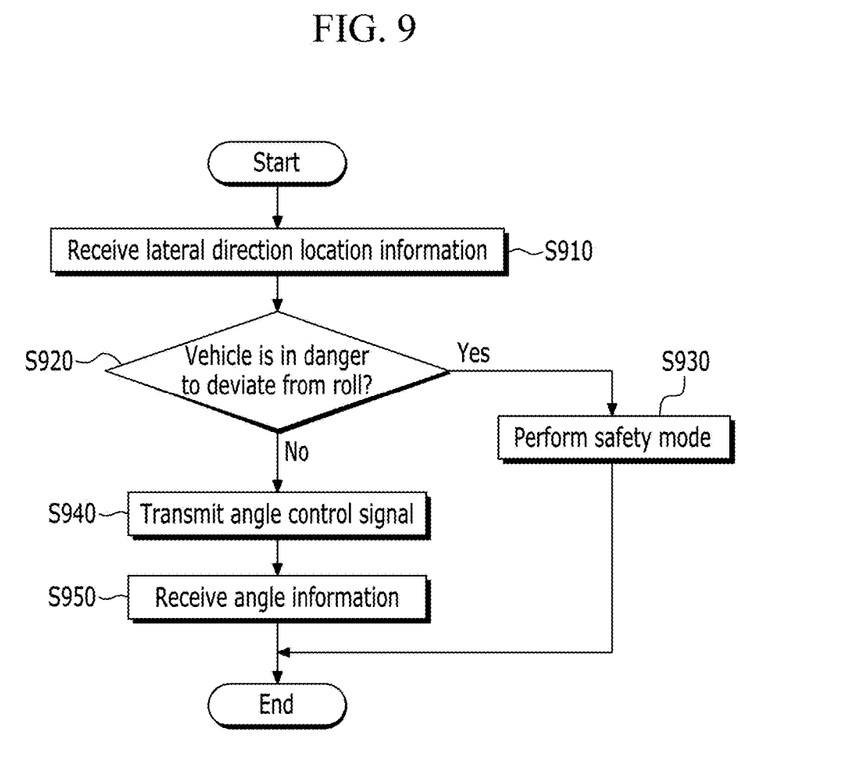
FIG. 9 is a flowchart illustrating a method of testing a steering device of a vehicle according to an embodiment of the present invention.

FIG. 9 is a flowchart illustrating a method of testing a steering device 320 of a vehicle according to an embodiment of the present invention.

Referring to FIG. 9, the control apparatus 100 receives lateral direction location information from the location sensor 230 (S910). In other words, when the vehicle 300 runs on the roll 210 of the roll and brake apparatus 200, the location sensor 230 measures a lateral direction of the vehicle 300 and transmits measured lateral direction location information to the control apparatus 100. The control apparatus 100 receives lateral direction location information from the location sensor 230.

The control apparatus 100 determines whether the vehicle 300 is in danger to deviate from the roll 210 based on lateral direction location information (S920). That is, if lateral direction location information is equal to or larger than a reference location, the control apparatus 100 may determine that the vehicle 300 is in danger to deviate from the roll 210.

If the vehicle 300 is in danger to deviate from the roll 210, the control apparatus 100 performs a safety mode (S930). That is, if the vehicle 300 is in danger to deviate from the roll 210, in order to prevent the vehicle 300 from deviating from the roll 210, the control apparatus 100 may stop driving of a driver that is included in the roll and brake apparatus 200 to stop driving of the roll 210.

If the vehicle 300 is not in danger to deviate from the roll 210, the control apparatus 100 transmits an angle control signal according to lateral direction location information to the vehicle 300 (S940). In other words, if the vehicle 300 is not in danger to deviate from the roll 210, the control apparatus 100 generates an angle control signal for adjusting the steering device 320 based on lateral direction location information. The control apparatus 100 transmits the angle control signal to the wireless communication device 310. The wireless communication device 310 provides the angle control signal to the steering device 320. The steering device 320 adjusts a handle according to the angle control signal.

The control apparatus 100 receives angle information from the angle sensor 325 (S950). In other words, the angle sensor 325 measures a moving angle of the steering device 320 and transmits measured angle information to the control apparatus 100. The control apparatus 100 may determine whether the steering device 320 has been accurately moved according to an angle control signal based on angle information.

Figure 10:
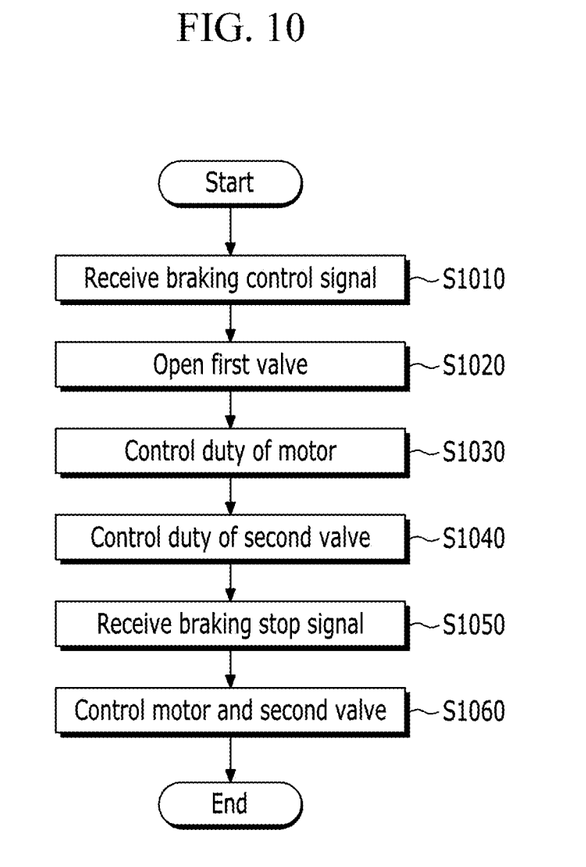
FIG. 10 is a flowchart illustrating a method of testing a brake of a vehicle according to an embodiment of the present invention.

FIG. 10 is a flowchart illustrating a method of testing a brake 335 of a vehicle according to an embodiment of the present invention.

Referring to FIG. 10, the vehicle 300 receives a braking control signal from the control apparatus 100 (S1010). In other words, the control apparatus 100 generates a braking control signal based on a speed profile. The control apparatus 100 transmits a braking control signal to the wireless communication device 310. The wireless communication device 310 of the vehicle 300 receives a braking control signal from the control apparatus 100.

The vehicle 300 opens the first valve 420 based on the braking control signal (S1020). That is, the ESC 330 of the vehicle 300 opens the first valve 420 based on the braking control signal. Accordingly, the first valve 420 supplies a brake liquid to the motor 430.

The vehicle 300 controls a duty of the motor 430 based on the braking control signal (S1030). In other words, the ESC 330 of the vehicle 300 determines a duty control signal of the motor 430 that is included in the braking control signal and controls a duty of the motor 430 based on the duty control signal of the motor 430. Accordingly, the motor 430 may adjust an amount of a brake liquid supplying to the second valve 440 to control a braking force.

The vehicle 300 controls a duty of the second valve 440 based on the braking control signal (S1040). In other words, the ESC 330 of the vehicle 300 determines a valve duty control signal that is included in the braking control signal and controls a duty of the second valve 440 based on the valve duty control signal. Accordingly, the second valve 440 may adjust an amount of a brake liquid supplying to the brake valve to control a braking force.

The vehicle 300 receives a braking stop signal from the control apparatus 100 (S1050). In other words, the control apparatus 100 determines a speed of the vehicle 300 and generates a braking stop signal, if a speed of the vehicle 300 is 0. The control apparatus 100 transmits the braking stop signal to the wireless communication device 310 of the vehicle 300. The ESC 330 receives a braking stop signal through the wireless communication device 310.

When receiving the braking stop signal, the vehicle 300 controls the motor 430 and the second valve 440 (S1060). That is, when receiving the braking stop signal, the ESC 330 of the vehicle 300 closes the first valve 420 and stops operation of the motor 430 and the second valve 440.

According to an embodiment of the present invention, by automatically testing a steering device, an accelerator, a transmission, and a brake of a vehicle using a roll and brake apparatus, a quality deviation does not occur in a test result, personnel expenses can be saved.

Further, because a control apparatus can transmit a control signal through a wireless communication device that is installed in a vehicle to test the vehicle, a unmanned test is performed and thus various tests that could not be performed due to a safety problem can be performed.

The illustrative logical blocks and modules described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A roll-and-brake test system, comprising:
   a roll-and-brake apparatus comprising a platform over which a subject-to-test vehicle is placed, wherein the platform comprises rolls on which wheels of the subject-to-test vehicle are placed;
   location sensors coupled to the platform, wherein the location sensors are spaced from each other such that the location sensors are located by both sides of the subject-to-test vehicle, respectively, when the subject-to-test vehicle is placed over the platform, wherein the location sensors are configured to measure lateral movement of the subject-to-test vehicle placed over the platform;
   a management apparatus configured to generate test information for testing the subject-to-test vehicle; and
   a control apparatus configured to control operation of the rolls, wherein the control apparatus is further configured to receive the test information from the management apparatus and to transmit a vehicle control signal to the subject-to-test vehicle to test the subject-to-test vehicle according to the test information,
   wherein the control apparatus is configured to:
      receive lateral direction location information from the location sensors,
      determine whether the subject-to-test vehicle is in danger to deviate from the rolls based on the lateral direction location information, and
      cause to stop operation of the rolls when determined that the subject-to-test vehicle is in danger to deviate from the rolls,
   wherein the control apparatus is further configured to:
      receive the lateral direction location information from the location sensors when the subject-to-test vehicle under an acceleration test,
      generate an angle control signal according to the lateral direction location information, and
      transmit the angle control signal to a steering device of the subject-to-test vehicle that is configured to receive the angle control signal from the control apparatus and adjust an angle based on the angle control signal.

2. The roll-and-brake test system of claim 1, wherein the control apparatus generates an acceleration control signal based on a speed profile and transmits an acceleration control signal to an Electronic Stability Control (ESC) of the subject-to-test vehicle.

3. The roll-and-brake test system of claim 2, wherein the subject-to-test vehicle comprises an Engine Management System (EMS) that receives an acceleration control signal from the ESC and that sets an engine torque based on the acceleration control signal and that controls an engine based on the engine torque to accelerate the subject-to-test vehicle.

4. The roll-and-brake test system of claim 1, wherein the subject-to-test vehicle further comprises an angle measurement unit that measures an angle of the steering device, and
   the angle measurement unit measures an angle of the steering device to transmit the angle to the control apparatus.

5. The roll-and-brake test system of claim 1, wherein the brake that is included in the subject-to-test vehicle comprises:
   a first valve that supplies a brake liquid to a motor; and
   a second valve that supplies a brake liquid that is received from the first valve to a brake pad.

6. The roll-and-brake test system of claim 5, wherein the control apparatus generates a braking control signal based on a speed profile and transmits the braking control signal to an ESC of the subject-to-test vehicle.

7. The roll-and-brake test system of claim 1, wherein the control apparatus generates a shift control signal based on a speed profile and transmits the shift control signal to a shift controller of the subject-to-test vehicle.

8. The roll-and-brake roll and brake test system of claim 7, wherein the shift controller performs shift based on the shift control signal and transmits shift information to an EMS of the subject-to-test vehicle.

9. A method of controlling a roll-and-brake test, the method comprising:
  placing a vehicle over a platform of a roll-and-brake test system such that location sensors are located by both sides of the vehicle and that wheels of the vehicle are placed on rolls of the platform;
  generating an acceleration control signal based on a speed profile, when the vehicle enters on the rolls of the roll-and-brake test system and testing an accelerator that is included in the vehicle based on the acceleration control signal;
  generating an angle control signal according to lateral direction location information, when the vehicle accelerates and testing a steering device that is included in the vehicle based on the angle control signal;
  generating a shift control signal based on the speed profile and testing a transmission that is included in the vehicle based on the shift control signal; and
  generating a braking control signal based on the speed profile and testing the brake that is included in the vehicle based on the generated braking control signal,
  wherein the testing of the steering device comprises:
    receiving lateral direction location information from the location sensors,
    determining whether the vehicle is in danger to deviate from the rolls based on the lateral direction location information,
    when determined that the vehicle is in danger to deviate from the rolls, stopping operation of the rolls, and
    when determined that the vehicle is not in danger to deviate from the rolls, generating an angle control signal according to the lateral direction location information, transmitting the angle control signal to the steering device of the vehicle, and receiving angle information of the steering device from an angle sensor that is installed in the steering device.

10. The method of claim 9, wherein the testing of an accelerator comprises:
  transmitting an acceleration control signal based on the speed profile; and
  transmitting the acceleration control signal to the engine control apparatus of the vehicle through the braking control apparatus of the vehicle.

11. The method of claim 9, wherein the testing of the brake comprises:
  generating a braking control signal comprising a duty control signal of a valve and motor that are included in the brake based on the speed profile; and
  transmitting the braking control signal to an Electronic Stability Control (ESC).

* * * * *